Jan. 6, 1931.        C. H. ON        1,787,835
SHRIMP TREATING MACHINE
Filed July 1, 1927        3 Sheets-Sheet 2
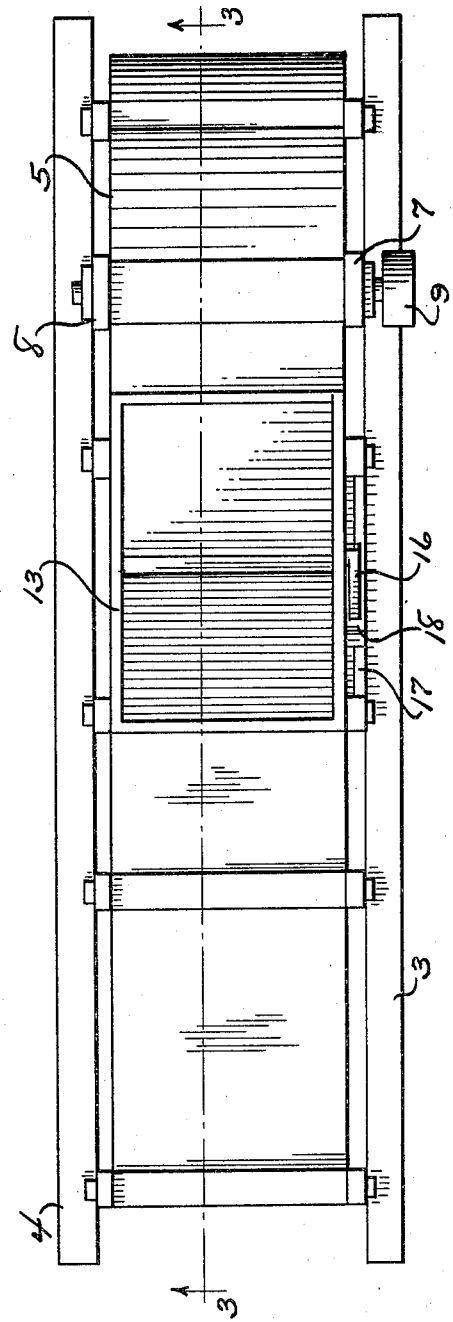
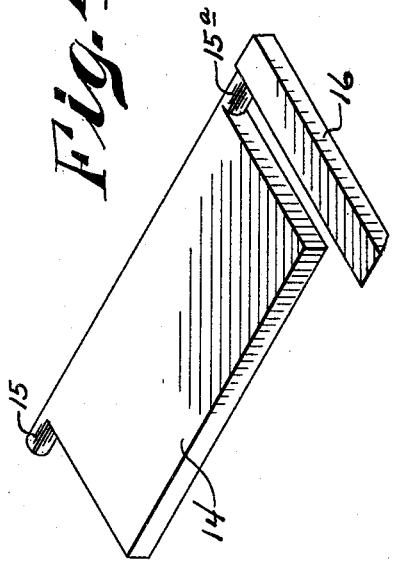
Chaw Hop On
INVENTOR
BY Victor J. Evans
ATTORNEY
WITNESS: 

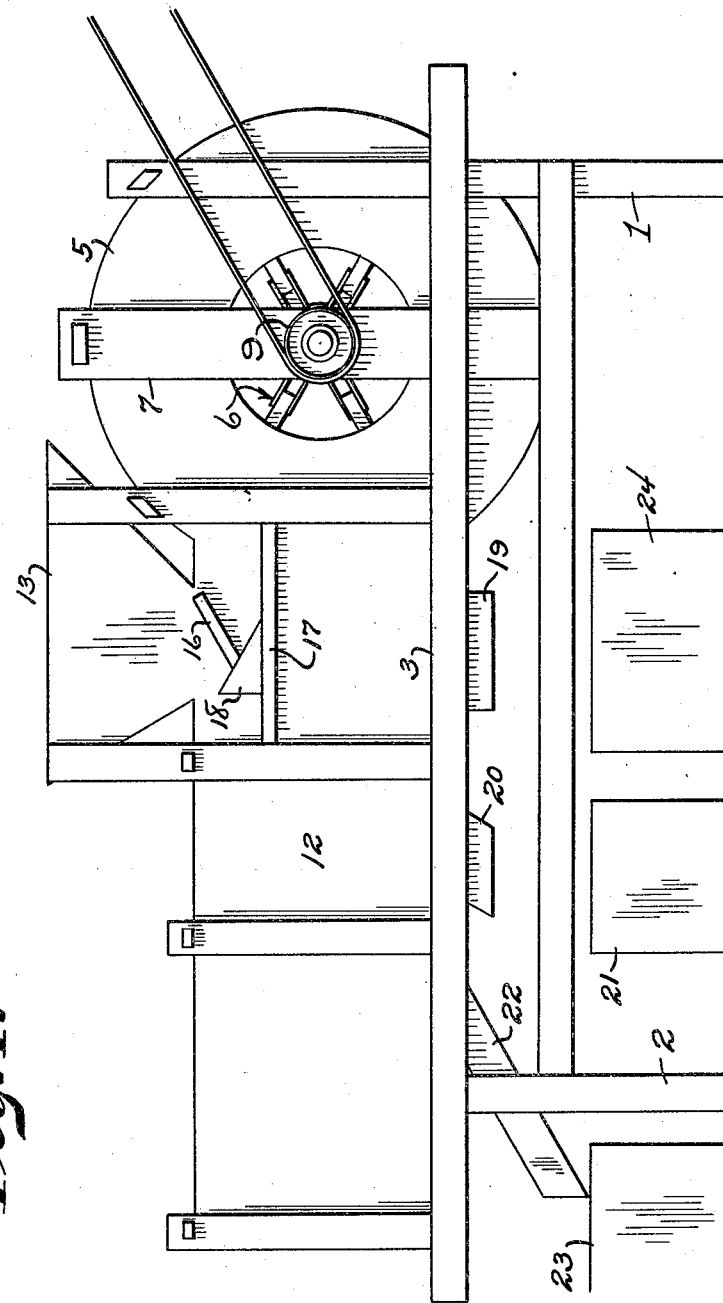

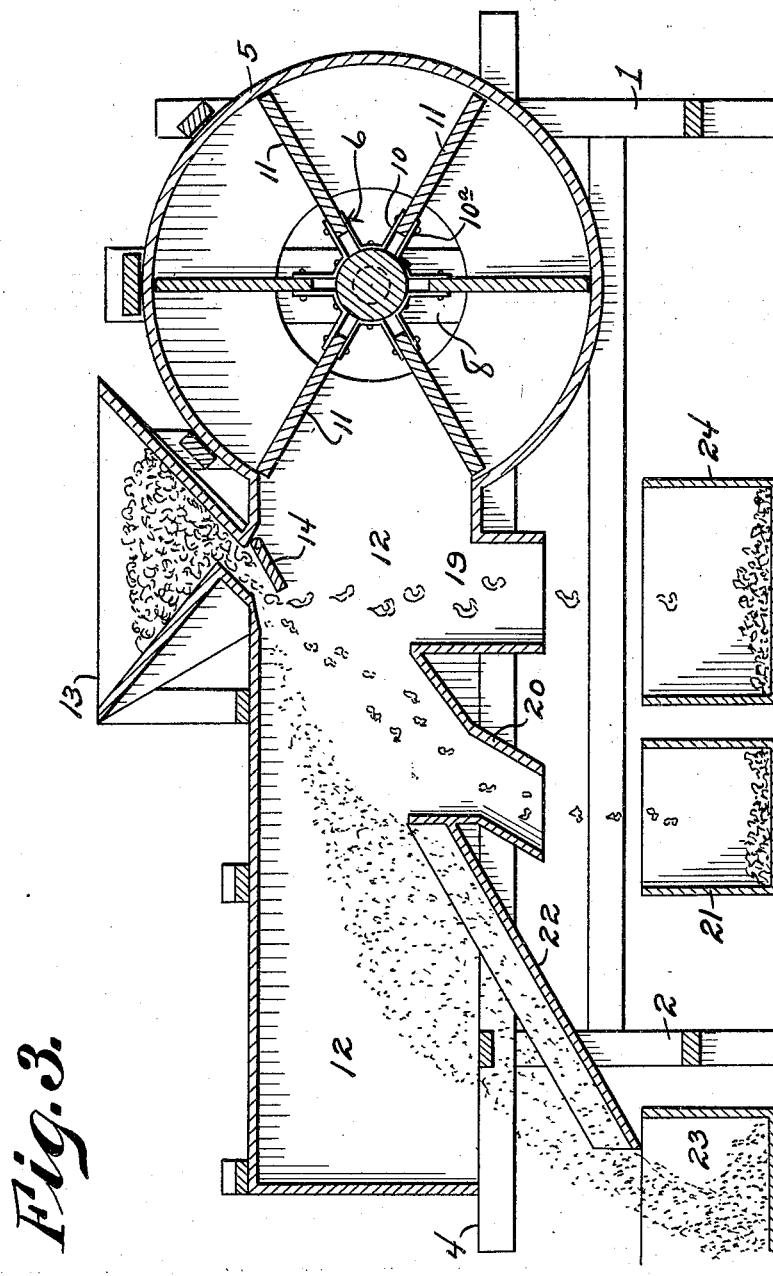

Patented Jan. 6, 1931

1,787,835

UNITED STATES PATENT OFFICE

CHAW HOP ON, OF NEW ORLEANS, LOUISIANA, ASSIGNOR TO QUONG SUN COMPANY INC., OF NEW ORLEANS, LOUISIANA

SHRIMP-TREATING MACHINE

Application filed July 1, 1927. Serial No. 202,960.

This invention relates to a machine for grading shrimp and separating the hulls therefrom. The machine comprises a rotary encased fan delivering a blast of air in an enclosed casing over a regulable delivery outlet from a hopper containing a mass of shrimp which has been subjected to a crushing machine to crack the shells. A series of delivery pipes are arranged in echelon progressively away from the fan, below which are placed receptacles to receive the graded products, and the walls of said pipes contract downwardly, or at least a sloping surface is provided by which the products may be separated, and the crushed hulls are delivered at the farthest receptacle. The best quality of shrimp has a greater weight than the poorer grade and having greater gravitative effect is least influenced by the blast of air and drops into the sloping guide and is delivered to the first grade box, and the poorer grade or bran constituting the crushed shell or hull is delivered to the final receptacle.

In carrying out my invention I provide a timber framework forming at one end a preliminary housing for a large rotary fan, and enclose the chute for the shrimp in a rectangular wooden box adjoining the fan.

In the accompanying drawings illustrating the invention:

Figure 1 is a side view of an apparatus embodying my improvements.

Figure 2 is a plan of the same.

Figure 3 is a median sectional view on the vertical plane 3—3 of Figure 2.

Figure 4 is an isometric projection of a regulating vane for limiting the discharge of the shrimp.

Figure 5 is a smaller view of a cooperating wedge for adjusting the discharge opening of the hopper.

Referring now in detail to the drawings, 1 and 2 represent vertical timber posts on pairs of which are supported a wooden framework 3, 4 closed at the top and communicating with an annular closed casing 5 containing a large rotary fan 6, the axis of which turns in side posts 7, 8, a pulley 9 permitting application of power. The casing 5 houses a large fan with 18-inch blades bolted in metallic brackets 10, 10a, a plurality of which are provided for the fan blades 11. The sides of the casing have a 9-inch opening to permit induction of air when the fan is in rotation and a strong blast of air is directed through the conduit 12. Adjacent to the fan casing is a hopper 13 with inclined sides tapering to the bottom forming a supply for the crushed shrimp and the opening at the bottom is closed by a rectangular vane 14 so that the discharge of shrimp may be varied. This vane or damper is shown in isometric projection in Figure 4. It has cylindrical ends 15, 15a forming pivotal mountings in the side walls of the rectangular casing and carries at one end a stout rectangular bar 16. The rectangular body of the vane 14 is enclosed within the hopper between its side walls, and the bar 16 lies outside between the hopper walls and the side 3 of the framework, and on the bar 17 is a triangular slide or wedge 18 which may be adjusted by hand to vary the angle at the mouth of the hopper, thereby raising or lowering the vane 14 to vary the size of the discharge opening of the shrimp. The spout delivering the best grade of shrimp, seen at 19 in Figure 3, is in substantial alignment with the discharge opening of the hopper for the shrimp. The adjacent spout for the poorer grade of shrimp communicates therewith by a downwardly inclined wall 20 which delivers the second grade to its receptacle 21. The hulls of the shrimp are delivered on the downwardly tilting table 22 to the receiver for the bran 23.

In operation the supply of the cracked shrimp is delivered to the hopper and the fan put into rotation. The delivery of the sea food is automatic, gravity acting to deliver the slippery mass through the regulable opening at the bottom, the weight of the shrimp contributing to promote the feed. The grades are delivered in the respective tanks, the lighter elements as seconds and bran being most effected by the air blast are delivered to their respective receptacles. During the action of the machine the manual adjustment of the valve or vane 14 and the stirring up of the shrimp mass in the hopper continues the supply with the action of the fan, and additional increments of shrimp are added to the hopper to continue the operation until the entire supply has been sorted.

Having thus described my invention, what I claim as new and desire to secure by Letters Patent is:

The combination with a discharge hopper and support therefor, of means for controlling the discharge of material from the hopper, and including a gate valve arranged within the hopper directly beneath the discharge opening thereof, trunnions projecting from the opposed corners of the valve and pivoted in the adjacent walls of the hopper, an elongated bar carried by one of the trunnions and arranged exteriorly of the hopper, said bar being arranged in spaced parallel relation to the adjacent edge of the valve and having its underside beveled adjacent its free end, and a wedge shaped element of angle formation in cross section slidably mounted on the support for the hopper and adapted to be moved beneath said bar to vary the degree of opening of the valve for the purpose specified.

In testimony whereof I affix my signature.

CHAW HOP ON.